(12) United States Patent
Nagata et al.

(10) Patent No.: US 8,749,822 B2
(45) Date of Patent: Jun. 10, 2014

(54) IMAGE PROCESSING APPARATUS AND IMAGE PROCESSING METHOD

(75) Inventors: Tadashi Nagata, Kanagawa (JP);
Yasuhito Shinchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 199 days.

(21) Appl. No.: 13/067,023

(22) Filed: May 3, 2011

(65) Prior Publication Data

US 2011/0292439 A1    Dec. 1, 2011

(30) Foreign Application Priority Data

May 25, 2010 (JP) .................... 2010-119332
Mar. 28, 2011 (JP) .................... 2011-071098

(51) Int. Cl.
*G06F 3/12* (2006.01)
(52) U.S. Cl.
USPC ........................... 358/1.15; 358/1.16
(58) Field of Classification Search
None
See application file for complete search history.

(56) References Cited

U.S. PATENT DOCUMENTS

| 5,905,819 | A * | 5/1999 | Daly | 382/284 |
| 2005/0286088 | A1 * | 12/2005 | Takagi | 358/3.28 |
| 2006/0002584 | A1 * | 1/2006 | Lu | 382/100 |
| 2009/0284775 | A1 * | 11/2009 | Muramatsu | 358/1.9 |

FOREIGN PATENT DOCUMENTS

| JP | 2006-014189 | 1/2006 |
| JP | 2007-174129 | 7/2007 |
| JP | 2009-152651 | 7/2009 |

\* cited by examiner

*Primary Examiner* — Mark Zimmerman
*Assistant Examiner* — Darryl V Dottin
(74) *Attorney, Agent, or Firm* — Harness, Dickey & Pierce, P.L.C.

(57) ABSTRACT

An image processing apparatus includes a first determination part that determines whether an image in which a feature image is embedded is to be modified when the image is printed, based on the image and a state of the image processing apparatus; and a second determination part that determines a condition for avoiding the modification determined by the first determination part.

14 Claims, 3 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, and in particular, to processing of an image such as a document image in which a feature image such as a tint block is embedded.

2. Description of the Related Art

There is a technique of embedding a feature image in an image to be transmitted in order to avoid tampering with a document or such. The feature image is, for example, a tint block. In the above-mentioned technique, for example, an image to be transmitted (for example, a document image) is converted into a tint block, the obtained tint block is embedded in the document image, and the document image in which the tint block is thus embedded is transmitted. Then, an apparatus which has received the transmitted document prints the received document image. After that, it is possible to determine whether the printed document image has been tampered with.

That is, the printed document image in which the tint block is embedded is scanned by means of a scanner. At this time, the tint block embedded in the document image is taken out directly from the scanned document image. Also, the scanned document image is again converted into tint block. Then, the tint block directly taken out from the document image is compared with the tint block converted from the document image. Then, in a case where the printed document image has been tampered with, the document image scanned by means of the scanner (after having been tampered with) is different from the document image before having been transmitted (before having been tampered with), because of the tampering. As a result, the tint block converted from the document image scanned by means of the scanner (after having been tampered with) is different from the tint block having been converted from the document image before having been transmitted (before having been tampered with) and having been embedded in the document image. In contrast thereto, the tint block directly taken out from the document image scanned by means of the scanner is the same as the tint block having been converted from the document image before having been transmitted (before having been tampered with) and having been embedded in the document image, as long as the tint block itself, having been embedded in the document image, has not been tampered with. Therefore, in the case where the document image has been tampered with, the tint block directly taken out from the scanned document image does not agree with the tint block converted from the scanned document image. Thus, it is possible to determine whether the document image has been tampered with by determining whether the tint block directly taken out from the scanned document image agrees with the tint block converted from the scanned document image.

For example, Patent Document 1 (i.e., Japanese Laid-Open Patent Application No. 2009-152651) discloses a technique of transmitting an image in which a tint block is embedded. In the technique, in a case where a printer to which the image is transmitted does not have a tint block processing function, a document processing apparatus from which the image is transmitted creates a document in which a tint block is combined (i.e., embedded) into a document image, and transmits the created document to the printer. On the other hand, in a case where the printer has the tint block processing function, the document processing apparatus does not combine the tint block into the document image, and transmits the document, as it is, to the printer. Thereby, since the document processing apparatus does not carry out combining the tint block into the document image in the case where the printer has the tint block processing function, it is possible to reduce a period of time of the processing carried out by the document processing apparatus.

Further, Patent Document 2 (i.e., Japanese Laid-Open Patent Application No. 2006-14189) discloses a printed matter processing system that carries out a check as to whether a document image has been tampered with. In this system, feature data is extracted from a content image obtained as a result of printed matter being scanned by a printed matter issuance apparatus. Then, a feature image such as a bar code is generated from the extracted feature data, the content image on which the feature image is superposed is printed, and thus, printed matter with the feature image is obtained. Then, a printed matter check apparatus extracts the feature image from a content image with the feature image, obtained from scanning the printed matter with the feature image, and restores the feature data from the extracted feature image. Further, the printed matter check apparatus extracts, from the content image with the feature image, the content image from which the feature image is removed, and extracts the feature data from the thus-extracted content image. Then, a check as to whether the content image has been tampered with is carried out by comparing the feature data restored from the feature image and the feature data extracted from the content image.

SUMMARY OF THE INVENTION

According to an embodiment of the present invention, an image processing apparatus includes a first determination part that determines whether an image in which a feature image is embedded is to be modified when the image is printed, based on the image and a state of the image processing apparatus, and a second determination part that determines a condition for avoiding the modification determined by the first determination part.

Other objects, features and advantages of the embodiment of the present invention will become more apparent from the following detailed description when read in conjunction with the accompanying drawings.

DETAILED DESCRIPTION OF THE EMBODIMENTS

First, a problem in the related art will be described.

For example, a case will be assumed where a document in which a feature image such as a tint block (hereinafter, simply referred to as a "feature image") is embedded is transmitted by a document processing apparatus, the transmitted document is received by a printer and the received document is printed by the printer. In such a case, depending on a state of the printer, the received document may not be printed in such a state of being able to detect tampering after the printing. For example, there may be a case where in the printer, only paper of a size smaller than a size of the received document (data) is set. In such a case, the printer divides or reduces in size (i.e., modifies) the received document so that the received document can be printed by using the paper of the size smaller than the size of the received document (data). However, when the received document is thus modified, the feature image embedded in the document is also modified accordingly. When the feature image embedded in the document is thus modified together with the document and the modified document is printed together with the modified feature image, a detection of tampering by using the feature image may not be possible. That is, in a case where the document is printed in a state where the feature image is not modified, the feature image taken out from the printed image agrees with the feature image converted from the printed document when the printed document has not been tampered with. However, in a case where the document is printed in a state where the feature image is modified, the feature image taken out from the printed image may not agree with the feature image converted from the printed document or the feature image may not be able to be taken out from the printed document, although the printed document has not been tampered with. In such a case, a detection of tampering for the printed document is not available.

An embodiment of the present invention has been devised in consideration of the above-mentioned problem and an object of the embodiment of the present invention is to provide an image processing apparatus and an image processing method in which when an image such as a document image in which a feature image is embedded is printed, it is possible to carry out the printing in an optimum manner depending on the circumstances, i.e., the functions and/or setting conditions of the image processing apparatus.

The embodiment of the present invention will be described in detail with reference to figures.

Figure 1:
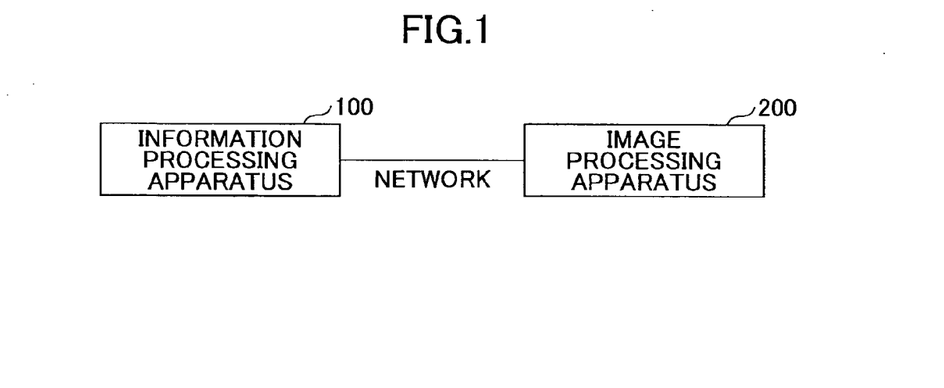
FIG. 1 shows a block diagram of one example of a system according to an embodiment of the present invention.

FIG. 1 shows a system according to the embodiment of the present invention. The system includes an information processing apparatus 100 and an image processing apparatus 200. The information processing apparatus 100 and the image processing apparatus are connected in such a manner that mutual communication can be carried out by a communication network such as a LAN (Local Area Network), the Internet, a telephone line, or such.

The information processing apparatus 100 is, for example, a PC (Personal Computer), and carries out analysis and creation of a feature image. The information processing apparatus 100 transmits data (i.e., an image or such) to the image processing apparatus 200. The image processing apparatus 200 is, for example, a MFP (MultiFunction Peripheral), and carries out printing the data received from the information processing apparatus 100. It is noted that the information processing apparatus 100 may be, for example, an image processing apparatus such as a MFP that can carry out analysis and creation of a feature image.

As a feature image to be embedded in an image of a document or such, a feature image disclosed in Patent Document 2 may be used, for example. The feature image disclosed by Patent Document 2 may be produced from feature data by using a technique of printing bar code or private information. The feature data of Patent Document 2 is data indicating a feature or a position of a feature of an image of a document or such. The feature of the image of the document or such may be, for example, data indicating the feature of the image of the document or such, which may be extracted by using a well-known image feature extraction technique, such as vector information or a frequency component (i.e., a frequency component that may be obtained from DCT (Discrete Cosine Transform), wavelet transform, or such). It is noted that such extraction of or extracting the feature data from the image of the document or such, or extraction of or extracting the feature data from the image of the document or such and then generation of or generating the feature image from the extracted feature data may be simply referred to as "conversion" (or "data conversion") or "converting" hereinafter. The position of the feature of the image of the document or such may be expressed by a relative position from a reference position which is determined on the image of the document or such. Thus, the feature image may be generated (or created) based on the feature data that indicates the feature and the position of the feature of the image of the document or such.

For example, a case will be assumed where the user operates the information processing apparatus 100 to give an instruction to transmit an image of the document, in which a feature image is embedded, for the image processing apparatus 200. In such a case, the information processing apparatus 100 creates a feature image from the image of the document, which has been obtained through scanning by means of a scanner, communication through a communication network, facsimile communication, reading out from a recording medium, or such. Then, the information processing apparatus 100 embeds the created feature image into the image of the document, and transmits the image of the document in which the feature image is embedded to the image processing apparatus 200. When receiving the image of the document in which the feature image is embedded, the image processing apparatus 200 prints the received image of the document (hereinafter, an image of a document may be simply referred to as a "document image"). As a specific method of embedding a feature image into a document image, the feature image such as bar code may be embedded in a blank portion of the document image, the feature image having transparency may be embedded into the entire area of the document image, or so, for example, as shown in FIG. 2 of Patent Document 2.

Figure 2:
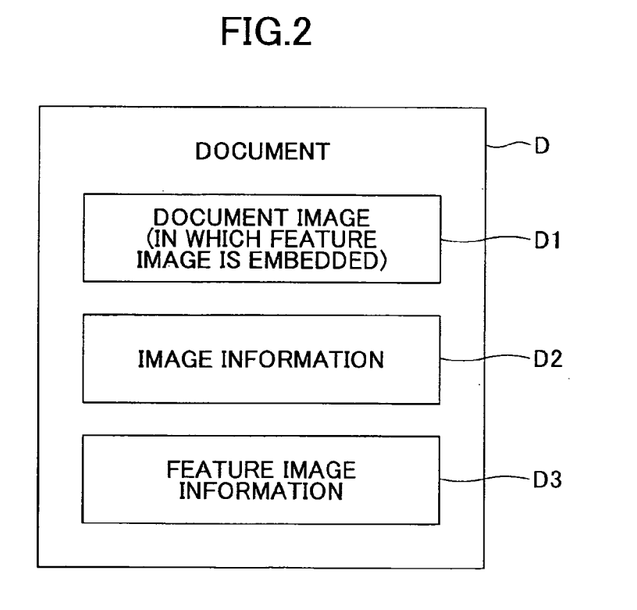
FIG. 2 shows a one example of a configuration of data of a document transmitted and received in the system shown in FIG. 1.

FIG. 2 shows an example of a configuration of data of a document (for example, a data file) which is transmitted or received in the system according to the embodiment of the present invention. For example, as shown in FIG. 2, data of a document D includes one or plural pages of document images D1. In this example, on each page of the document images D1, a feature image is be embedded. The data of the document D further includes image information D2 for each page of the document images D1, and the image information D2 may include information such as a size of the document image, resolution of the document image, and so forth. The data of the document D further includes feature image information D3 indicating whether the feature image is embedded in the document image, what feature image is embedded in the document image in a case where the feature image is embedded in the document image, and so forth.

The feature image information D3 may include information that is obtained through converting the document image D1 and depends on the particular document image D1. In this case, it is possible to obtain the feature image of the document image D1 only based on the feature image information D3 without referring to the document image D1. Alternatively, the feature image information D3 may include information which is used to obtain the feature image based on (through data conversion from) the document image D1 and does not depend on the particular document image D1. In this case, it is possible to obtain the feature image of the document image D1 based on the document image D1, referring to the feature image information D3.

It is noted that the data of the document D may include printing setting information (such as a change of the size of image, stapling, or such) in addition to the document image D1, the image information D2 and the feature image information D3.

Figure 3:
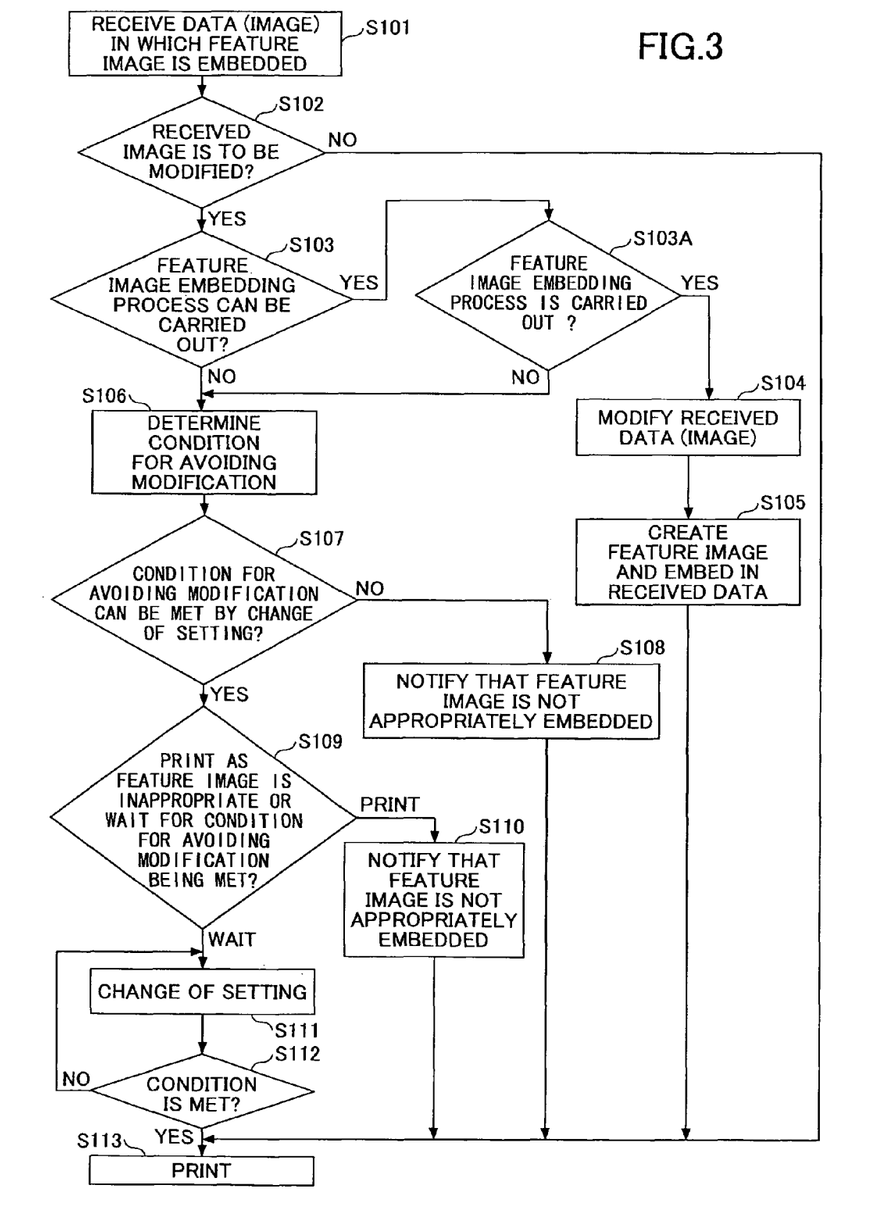
FIG. 3 shows a flowchart of one example of processing operations carried out by an image processing apparatus according to the embodiment of the present invention.

FIG. 3 shows a flow of one example of processing operations carried out by the image processing apparatus 200 when the image processing apparatus 200 receives the data of the document D from the information processing apparatus 100. It is noted that data that the image processing apparatus 200 receives from the information processing apparatus 100 and processes is not limited to such data of a document, and may be data of a chart, a diagram, or such, for example.

When the image processing apparatus 200 receives the data of the document D having the configuration shown in FIG. 2 (step S101), the image processing apparatus 200 determines, from the image information D2 (and/or the above-mentioned printing setting information) of the data of the document D and device information (i.e., information stored in a device information storage part 290 described later with reference to FIG. 4) of the image processing apparatus 200, whether it is necessary to modify the document image D1 of the data of the document D upon printing the document image D1 (step S102). It is noted that receiving the data of the document D may be not only receiving the data of the document D through the communication network such as the LAN, the Internet, or such, but also receiving the data of the document D through facsimile. In the case of receiving the data of the document D through facsimile, the data of the document D may include only the document image D1.

As an example where it is necessary to modify the document image D1, there may be a case where the image processing apparatus 200 can carry out printing only on paper of a size smaller than the size of the document image D1. In this case, in order to print the given document image D1 on the paper of the size by which the image processing apparatus 200 can carry out printing, it is necessary, before the printing, to modify such as dividing the given document image D1 into plural images, reducing the size of the given document image D1, or so. However, as the document image D1 is thus modified, there occurs a difference between the feature image originally embedded in the document image D1 and the feature image obtained after the document image D1 is modified, as mentioned above. As a result, it may not be possible to carry out a detection of tampering for the printed document image.

It is noted that as examples where it is necessary to modify the document image D1, other than the case where the document image D1 needs to be changed in its size such as being reduced in its size as mentioned above or magnified, there may be a case where the density (or shade) of the document image D1 needs to be changed, a case where the document image D1 needs to have a void, or such. The case where the image needs to be changed in its size may include a case where, as mentioned above, the size of the document image D1 is not included in the range in size of paper the image processing apparatus 200 currently has, or a case where the user has designated to change the size of the document image D1. The case where the user has designated to change the size of the document image D1 may be a case where, for example, the image information D2 shown in FIG. 2 (or the above-mentioned printing setting information) includes the user's instruction that when the document image D1 is printed, the size of the document image D1 is to be changed (for example, reduced).

The case where the density (or shade) of the image needs to be changed may be a case where a toner shortage occurs in the image processing apparatus 200, a toner saving mode is set in the image processing apparatus 200, or such. In such a case, by reducing the density (or shade) of the image, it is possible to reduce a toner amount used by printing the image. Thereby, it is possible to elongate a period of time elapsing until the toner in the image forming apparatus 200 will become consumed in the case where the toner shortage occurs, or save the toner in the case where the toner saving mode is set in the image processing apparatus 200.

The case where the document image needs to have a void may be a case where the paper on which the image has been printed undergoes a punching process to punch holes in the paper (for the purpose of book binding or so). As a result of the punching process being thus carried out in the paper on which the image has been printed, a partial void may occur in the image having been printed on the paper (i.e., parts of the image are removed as being punched out). In such a case, in order to make it possible to detect tampering using a feature image, it is necessary to newly create a feature image based on the document image of the state where the parts of the image have been removed (are lacking) by the punching process. For this purpose, it is necessary to modify the document image to obtain the image in the state where the parts of the image have been removed (are lacking).

It is noted that a setting for the above-mentioned toner save mode, a setting for the above-mentioned punching process, and so forth, may be set in toner information 290c, post process setting information 290d, and so forth, stored in the device information storage part 290 of the image processing apparatus 200, described later with reference to FIG. 4, or may be set in the image information D2 (or the printing setting information).

When the image processing apparatus 200 determines that it is necessary to modify the document image D1 (step S102 YES), the image processing apparatus 200 then determines whether the image processing apparatus 200 itself can carry out a process of embedding a feature image (step S103).

It is noted that in order that "the image processing apparatus 200 itself can carry out a process of embedding a feature image", the image processing apparatus 200 has a function of generating (or creating) a new feature image based on the above-mentioned modified document image (by means of converting the document image, or so), and embedding the generated new feature image in the modified document image. When the image processing apparatus 200 has this function, generates a new feature image based on the above-mentioned modified document image and embeds the generated new feature image in the modified document image, a detection of tampering can be carried out for the printed document after the modified document image in which the new feature image has been embedded is printed, as in the case where the document image D1 does not need to be modified (step S102 NO) and the document image D1 is printed as it is (step S113).

In a case where the image processing apparatus 200 itself can carry out a process of embedding a feature image (step S103 YES), the image processing apparatus 200 then determines whether the image processing apparatus 200 itself actually carries out the process of embedding a feature image (step S103A). This determination of step S103A is carried out based on the user's selection operation. That is, the image processing apparatus 200 displays to the user to urge the user to carry out a selection as to "whether the image processing apparatus 200 itself carries out the process of embedding a feature image". Then, the image processing apparatus 200 determines whether the image processing apparatus 200 itself carries out the process of embedding a feature image, according to the user's selection operation carried out in response to the above-mentioned displaying by the image processing apparatus 200.

When the determination result of step S103A is that the image processing apparatus 200 itself carries out the process of embedding a feature image (YES), step S104 is proceeded to. On the other hand, when the determination result of step S103A is that the image processing apparatus 200 itself does not carry out the process of embedding a feature image (NO), step S106 is proceeded to.

In step S104, the image processing apparatus 200 removes the feature image originally embedded in the document image D1 from the document image D1, and carries out the modification, determined to be carried out in step S102, on the document image D1 from which the feature image is thus removed. Next, in step S105, the process of embedding a feature image into the modified image is carried out. That is, the image processing apparatus 200 itself newly creates a feature image (by means of converting the modified image, or so) based on the modified image (and/or based on the feature image information D3, as is necessary). Then, the created feature image is embedded in the modified image. Then, the modified image (document image) in which the feature image is newly embedded is printed out (step S113). Thus, it is possible to print the document in which the feature image is, in the appropriate state (i.e., in the state where after the printing, a detection of tampering is available), embedded.

On the other hand, in a case where the image processing apparatus 200 itself cannot carry out the process of embedding a feature image (step S103 NO) or in a case where the image processing apparatus 200 itself does not carry out the process of embedding a feature image (step S103A NO), the image processing apparatus 200 determines a condition for avoiding the modification, determined to be carried out in step S102 (step S106). Here, a condition for avoiding the modification (described later), determined to be carried out in step S102, is determined based on the image information D2 (or the printing setting information). Then, the image processing apparatus 200 determines, based on the condition for avoiding the modification determined in step S106, whether a change of setting is available in the image processing apparatus 200, by which the document image D1 can be printed while avoiding the modification (step S107).

For example, in the above-mentioned case where the image processing apparatus 200 has only paper of the size smaller than the size of the document image D1, "a condition for avoiding the modification" to be determined in step S106 is, for example, that paper of the size equal to or larger than the size of the document image D1 is newly set in the image processing apparatus 200. In this case, the image processing apparatus 200 may determine in step S107 whether the change of setting, i.e., paper of the size equal to or larger than the size of the document image D1 being newly set in the image processing apparatus 200, is available, from the range in size of paper that can be set in the image processing apparatus 200 (based on paper size information 290a described later). At this time, when the size of the document image D1 is not included in the range in size of paper that can be set in the image processing apparatus 200, it is determined that it is not possible to carry out the change of setting for satisfying the "condition for avoiding the modification in the image processing apparatus 200 (step S107 NO).

In a case where the above-mentioned change of setting is not available (step S107 NO), the modification determined to be carried out in step S102 cannot be avoided, and also, as mentioned above, newly creating a feature image for the modified image is not carried out (step S103 NO or step S103A NO). Therefore, it is not possible to print the document in the appropriate state (i.e., the state where it is possible to carry out a detection of tampering by using a feature image). Therefore, the image processing apparatus 200 reports to the user that the document is printed in which the feature image is not, in the appropriate state (i.e., the state of making it possible to detect tampering), embedded (in step S108). Then, the image processing apparatus 200 carries out the modification determined to be carried out in step S102, and prints the document (step S113). As a specific method of reporting to the user, a corresponding alarm is displayed to the user, a mark, indicating that the document is printed in which the feature image is not in the appropriate embedded state, is added to the printed document, or so.

Thus, according to the embodiment of the present invention, it is determined in step S107 whether the change of setting, for making it possible to print the document image without carrying out the modification determined to be carried out in step S102, is available in the image processing apparatus 200. Thereby, it is possible to avoid a situation that the image processing apparatus 200 waits to carry out printing although it is not possible to avoid the modification.

On the other hand, in a case where the above-mentioned change of setting is available (step S107 YES), the image processing apparatus 200 displays to the user to urge the user to actually carry out the change of setting (for example, operation of setting new paper of the size equal to or larger than the size of the document image D1 in the image processing apparatus 200). Further, the image processing apparatus 200 urges the user to select whether to print the document image D1 in which the feature image is not, in the appropriate state (i.e., the state where a detection of tampering is available), embedded, or to wait to print until the image processing apparatus 200 comes to be able to print the document image D1 without carrying out the above-mentioned modification (i.e., until the change of setting is carried out for making it possible to print the document image D1 without carrying out the above-mentioned modification) (step S109). That is, the image processing apparatus 200 displays to the user the operation to avoid the modification, and also, displays to the user to urge the user to select whether to immediately print the document image D1 in which the feature image is not, in the appropriate state, embedded or to wait to print until the image processing apparatus 200 enters a state of being able to print the document image D1 without carrying out the modification. Then, when the user carries out the operation of selection in response to the displaying to urge the user to do so, the image processing apparatus 200 carries out the determination of step S109 according to the given user's operation of selection.

In a case where the user has selected to cause the image processing apparatus 200 to wait to carry out printing (step S109 WAIT), the change of setting in the image processing apparatus 200 is carried out by the user (step S111). For example, in the above-mentioned example, i.e., in the case where the change of setting is a change of (or newly setting) the size of paper in the image processing apparatus 200 equal to or larger than the size of the document image D1, the user is to set the size of paper in the image processing apparatus 200 equal to or larger than the size of the document image D1. Therefore, in this case, the image processing apparatus 200 displays to the user to urge the user to set paper of the size equal to or larger than the size of the document image D1, so that in response to the displaying, the user newly sets paper of the size in the image processing apparatus 200. As a result, the image processing apparatus 200 can print the document image D1 on the newly set paper of the size equal to or larger than the size of the document image D1 without carrying out the modification determined to be carried out in step S102.

When the image processing apparatus 200 thus enters the state of being able to print the document image D1 without carrying out the modification determined to be carried out in step S102 (step S112 YES), the image processing apparatus 200 prints the document image D1 as it is (step S113). The document image D1 thus printed has undergone no modification before the printing, and therefore, the feature image is embedded in the document image D1 still in the appropriate state. Therefore, the printed document is in the state where a detection of tampering by using the feature image is available. As a result, in a case where no tampering is carried out on the printed document, the feature image directly taken out from the document (or feature data restored from the feature image) will agree with the feature image (or the feature data) converted from the document, as mentioned above. On the other hand, in a case where tampering is carried out on the printed document, the feature image directly taken out from the document (or feature data restored from the feature image) will not agree with the feature image (or the feature data) converted from the document, as mentioned above. Thus, the tampering can be detected.

Thus, according to the embodiment of the present invention, it may be possible to avoid the modification such as dividing or reducing in size of the document image D1. Therefore, when it is possible to avoid the modification such as dividing or reducing in size of the document image D1, a process of newly embedding a feature image into the modified image becomes unnecessary. Thus, in this case, even when the image processing apparatus 200 cannot or does not carry out the process of embedding a feature image, it is possible to print the document in which the feature image is, in the appropriate state, embedded.

On the other hand, in a case where the user selects to rather immediately print the document even in which the feature image is not, in the appropriate state, embedded (step S109 PRINT), it is reported to the user that the feature image is not in the appropriate embedded state (step S110), the modification determined to be carried out in step S102 is carried out, the same as step S108 mentioned above, and the document image D1 is printed (step S113). Thus, it is possible to immediately print the received document although the feature image is not appropriate (i.e., in the state where a detection of tampering after the printing is not available) in a case where the modification is not avoidable at least at the present state of the image processing apparatus 200 and thus the document in which the feature image is in the appropriate embedded state is not available. As a result, it is possible to rather omit such extra work of taking the trouble of changing the setting in the information processing apparatus 100 to omit embedding the feature image in the document image D1 and again transmitting the document image D1 to the image processing apparatus 200. Further, by providing the option (step S109 PRINT) of immediately printing the document for when the modification is not avoidable at least at the present state of the image processing apparatus 200 and the document in which a feature image is in the appropriate embedded state is not available, it is possible to rather omit the operation and period of time otherwise required for the change of setting in the image processing apparatus 200 (for satisfying the condition for avoiding the modification), in a case where the user rather wishes to immediately print and check the received document although the feature image is not appropriate (i.e., in the state where a detection of tampering after the printing is not available).

Figure 4:
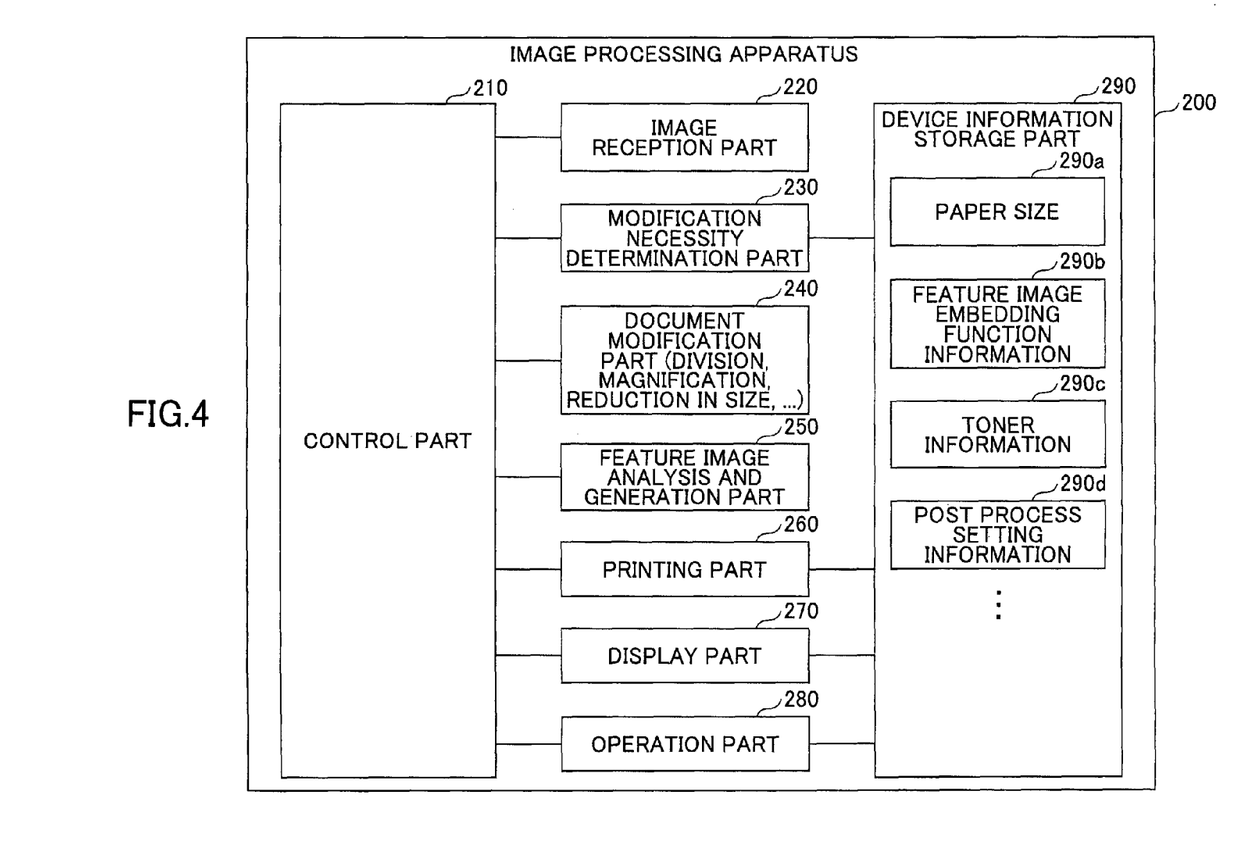
FIG. 4 shows a functional block diagram of the image processing apparatus according to the embodiment of the present invention.

FIG. 4 is a functional block diagram of the image processing apparatus 200 according to the embodiment of the present invention. As shown in FIG. 4, the image processing apparatus 200 includes a control part 210, an image reception part 220, a modification necessity determination part 230, a document modification part 240, a feature image analysis and generation part 250, a printing part 260, a display part 270, an operation part 280, and the device information storage part 290. The device information storage part 290 includes the paper size information 290a, a feature image embedding function information 290b, the toner information 290c, the post process setting information 290d, and so forth.

The control part 210 controls the respective parts of the image processing apparatus 200 by issuing various processing instructions to the respective parts, and controls a series of jobs from reception to printing of an image transmitted from the information processing apparatus 100. Below, the respective parts of the image processing apparatus 200 will be described with reference to the flowchart of FIG. 3.

The image reception part 220 receives the data of the document D from the information processing apparatus 100 (step S101 of FIG. 3).

The modification necessity determination part 230 obtains from the device information storage part 290 the paper size information 290a (indicating the size of paper set in the image processing apparatus 200, and so forth, for example), the toner information 290c (indicating that a toner shortage occurs or the toner save mode is set in the image processing apparatus 200, for example), the post process setting information 290d (indicating that the punching process is set, for example), and so forth, further reads the image information D2 (or the printing setting information) of the received data of the document D, and determines whether a modification of the document image D1 is necessary (step S102).

That is, in a case where it is determined from the paper size information 290a that the size of paper currently set in the image processing apparatus 200 is smaller than the size of the document image D1, it is necessary to divide the document image D1 into plural images, reduce the document image D1 in size, or so, to obtain images or a image having such a size that the printing can be carried out on the paper currently set in the image processing apparatus 200. In a case where it is determined from the toner information 290c that a toner shortage occurs in the image processing apparatus 200 or the toner save mode is set, it is necessary to reduce the image density (or shade) to reduce the toner using amount. In a case where it is determined from the post process setting information 290c that the punching process is necessary for the paper on which the printing has been carried out, it is necessary to identify image parts that are expected to be lacking or lost through the punching process, and create a feature image based on the document image (i.e., the modified image) in which the image parts are expected to be lacking or lost (steps S104, S105).

Further, in the case where the document image D1 is to be modified (step S102 YES), the modification necessity determination part 230 reads the feature image embedding function information 290b in the device information storage part 290, and determines from the feature image embedding function information 290b whether the image processing apparatus 200 can carry out a process of embedding a feature image (step S103). Thus, the feature image embedding function information 290b indicates whether the image processing apparatus 200 can carry out a process of embedding a feature image, for example. In a case where the image processing apparatus 200 cannot carry out the process of embedding a feature image (step S103 NO), the modification necessity determination part 230 determines the condition for avoiding the modification determined to be carried out in step S102 (step S106), and determines, from the paper size information 290*a*, the toner information 290*c*, the post process setting information 290*d*, or such, stored in the function information 290, whether the modification can be avoided by a change of setting in the image processing apparatus 200 (step S107).

In step S107, for example, in the case where the size of the document image D1 is larger than the size of paper currently set in the image processing apparatus 200, as mentioned above, the modifying necessity determination part 230 may determine (step S107) whether the modifying of dividing the document image D1 into plural images or reducing the document image D1 in size can be avoided by a change of setting, i.e., setting paper of the size equal to or larger than the size in the image processing apparatus 200. For example, in a case where the paper size information 290*a* indicates the range in size of paper that can be set in the image processing apparatus 200, it is possible to determine whether it is possible to avoid the modification by setting paper in the size equal to or larger than the size of the document image D1, by determining whether the size of the document image D1 is included in the range in size of paper of the image processing apparatus 200. When paper of the size equal to or larger than the size of the document image D1 can be set in the image processing apparatus 200, the necessary change of setting is thus obtained, and therefore the modification such as dividing or reducing the size of the document image D1 becomes unnecessary. Therefore, in this case, the condition for avoiding the modification (i.e., to set paper of the size equal to or larger than the size of the document image D1) can be satisfied to avoid the modification (step S107 YES).

In the case where, as mentioned above, an instruction of changing (for example reducing) the size of the document image D1 upon printing thereof is set in the image information D2 (or the printing setting information), the modification of changing (for example reducing) the size of the document image D1 can be avoided by a change of the setting, i.e., canceling the above-mentioned instruction of changing (for example reducing) the size of the document image D1 upon printing thereof. Therefore, in this case, the modifying necessity determination part 230 may determine that the condition for avoiding the modification (i.e., to cancel the instruction of changing the size of the document image) can be satisfied to avoid the modification (step S107 YES).

In the case where the toner shortage occurs or the toner save mode is set, the modification necessity determination part 230 may determine (step S107) from the toner information 290*c* whether the modification of reducing the density of the document image D1 can be avoided by a change of setting, i.e., supplying toner to solve the toner shortage or changing the toner information 290*c* to cancel the toner save mode, for example. When toner can be supplied to solve the toner shortage or the toner information 290*c* can be changed to cancel the toner save mode in the above-mentioned example, the necessary change of setting is thus obtained, and therefore the modification of reducing the density of the document image D1 becomes unnecessary. Thus, the condition for avoiding the modification (i.e., to supply toner or to cancel the toner save mode) can be satisfied to avoid the modification (step S107 YES). Actually, in the case where the toner shortage occurs, the modification necessity determination part 230 may determine that the modification can be avoided (step S107 YES) since generally speaking, the user can supply toner. In the case where the toner save mode is set, the modification necessity determination part 230 may determine that the modification can be avoided (step S107 YES) when the user is authorized to change the toner information 290*c* to cancel the toner save mode, for example.

In the case where the punching process is set, the modification necessity determination part 230 may determine (step S107) from the post process setting information 290*d* whether the modification of generating the image in the state where the image parts are lost or lacking caused by the punching process can be avoided by a change of setting to cancel the punching process, for example. When the post process setting information 290*d* can be changed to cancel the punching process, it becomes unnecessary to carry out the punching process on the paper on which the document image D1 has been printed. As a result, it becomes unnecessary to generate a feature image based on the image in the state where the image parts are lost or lacking, for the purpose of making it possible to detect tampering that may be made after the image is printed. Thus, in this case, the condition for avoiding the modification (i.e., to cancel the punching process) can be satisfied to avoid the modification to generate the image in the state where the image parts are lost or lacking because of the punching process (step S107 YES). Actually, the modification necessity determination part 230 may determine that the modification can be avoided (step S107 YES) when the user is authorized to change the post process setting information 290*d* to cancel the punching process, for example.

Thus, in a case where, as mentioned above, the setting of the toner save mode, the setting of the punching process to be carried out on the paper on which the printing has been carried out, or such, is set in the image information D2 of FIG. 2 (or the printing setting information), the modification necessity determination part 230 may determine (step S107) whether it is possible to avoid the modification or satisfy the condition for avoiding the modification by the change of setting to change the image information D2 (or the printing setting information) to cancel the toner save mode or to cancel the punching process.

When the determination result of step S109 is WAIT, the change of setting is carried out in the image processing apparatus 200 by the user (step S111). The modification necessity determination part 230 determines then whether the condition for avoiding the modification has been satisfied (step S112).

In step S112, in one of the above-mentioned examples, it is determined whether the condition for avoiding the modification has been satisfied as a result of the change of setting to set paper of the size equal to or larger than the size of the document image D1. In another example, it is determined whether the condition for avoiding the modification has been satisfied as a result of the change of setting to supply toner or to cancel the toner save mode. In another example, it is determined whether the condition for avoiding the modification has been satisfied as a result of the change of setting to cancel the punching process.

In a case where it has been determined in step S103 that the process of embedding a feature image can be carried out in the image processing apparatus 200 and it has been determined in step S103A that the process of embedding a feature image is be carried out in the image processing apparatus 200 itself, the feature image analysis and generation part 250 analyses the feature image embedded in the document image D1 and removes it from the document image D1 before the modification of the document image D1 is carried out in step S104. Then, after the modification of the document image D1 is carried out in step S104, the feature image analysis and generation part 250 creates a feature image based on (through conversion or such from) the thus-modified image, and embeds the created feature image in the modified image (step S105). It is noted that the case where the image processing apparatus 200 cannot carry out the process of embedding a feature image (step S103 NO) means that the image processing apparatus 200 does not have a function of carrying out the process of embedding a feature image, and thus, the feature image analysis and generation part 250 does not exist in the image processing apparatus 200.

The document modification part 240 carries out the necessary modification, such as dividing or reducing in size, on the document image D1 (step S104). Further, the document modification part 240 may have a function of printing a mark indicting that the document has been printed in which the feature image is not, in the appropriate state, embedded (step S108 and step S110).

The above-mentioned necessary modification may be, for example, as mentioned above, a modification of reducing the size or dividing the document image D1 to obtain an image or images of a size equal to or smaller than the size of paper the image processing apparatus 200 has, a modification of changing (reducing or so) the size of the document image D1 according to the image information D2 (or the printing setting information), a modification of reducing the density of the document image D1 when toner shortage occurs or the toner save mode is set, a modification of generating an image in which image parts are lost or lacking expectably caused by the punching process, or such modification.

The printing part 260 (including a well-known printing mechanism such as that using electrophotographic technology, for example) prints the document image D1 (step S113).

The display part 270 (including a LCD (Liquid Crystal Display), LED (Light Emitting Diodes), and so forth, for example) displays the settings set in the image processing apparatus 200, carries out alarm displays, or so. More specifically, for example, the display part 270 displays to the user to urge the user to select whether the process of embedding a feature image is to be carried out in the image processing apparatus 200 itself (step S103A). Further, the display part 270 displays to the user a specific operation to be carried out for the change of setting for avoiding the modification, and displays to the user to urge the user to select whether to immediately print the document in which the feature image is not, in the appropriate state, embedded or wait until the image processing apparatus 200 enters the state of being able to print the document image D1 without carrying out the modification (step S109). Further, the display part 270 may carry out an alarm display to point out that the feature image is not, in the appropriate state, embedded (step S108 and step S110).

The above-mentioned specific operation to be carried out for the change of setting for avoiding the modification is the user's operation, for example, to set paper of the size equal to or larger than the size of the document image D1 in the image processing apparatus 200, to change the image information D2 (or the printing setting information) to cancel an instruction of changing (reducing or so) the size of the document image D1, to supply toner to the image processing apparatus 200, to change the toner information 290c of the device information storage part 290 or the image information D2 (or the printing setting information) to cancel the toner save mode, to change the post process setting information 290d of the device information storage part 290 or the image information D2 (or the printing setting information) to cancel the punching process (of producing holes in the paper on which the printing has been finished), or so.

The operation part 280 (which may include a keyboard, a touch panel, a mouse, and so forth, for example) receives instructions given by the user's operations for changing the functions, the settings, or such, of the image processing apparatus 200. That is, the operation part 280 receives instructions given by the user's operations, for example, for a change of setting concerning receiving or printing of a document when the document is received and printed in the image processing apparatus 200, for the above-mentioned change of setting of the image processing apparatus 200 (step S111), or such, and sends the received instructions to the corresponding parts of the image processing apparatus 200 as is necessary. Further, the operation part 280 receives the user's instruction to select as to whether the process of embedding a feature image is to be carried out in the image processing apparatus 200 itself (step S103A). Further, the operation part 280 receives the user's instruction to select as to whether to immediately print the document in which the feature image is not, in the appropriate state, embedded or wait until the image processing apparatus 200 enters the state of being able to print the document image D1 without carrying out the modification (step S109).

It is noted that the change of setting of the image processing apparatus 200 in step S111 may include the user's change of setting to set paper of the size equal to or larger than the size of the document image D1 in the image processing apparatus 200, the user's change of setting to change, through the operation part 280, the image information D2 (or the printing setting information) to cancel an instruction of changing (reducing, or so) the size of the document image D1, the user's change of setting to supply toner to the image processing apparatus 200, the user's change of setting to change, through the operation part 280, the toner information 290c of the device information storage part 290 or the image information D2 (or the printing setting information) to cancel the toner save mode, the user's change of setting to change, through the operation part 280, the post process setting information 290d of the device information storage part 290 or the image information D2 (or the printing setting information) to cancel the punching process (of producing holes in the paper on which the printing has been finished), or so. In response to the user's operations for the changes of settings, the operation part 280 or another corresponding part sends the corresponding instructions to the device information storage part 290, and changes the corresponding information, as is necessary. It is noted that the changes of settings carried out in step S111 are not limited to those carried out through the operation part 280, and may include the changes of settings carried out as a result of parts of the image processing apparatus 200, other than the operation part 280, being operated by the user, i.e., the user's setting paper of a different size (i.e., equal to or larger than that of the document image D1, for example) in the image processing apparatus 200, the user's supplying toner to the image processing apparatus 200, and so forth.

The device information storage part 290 stores the settings and the states in the image processing apparatus 200, and sends necessary information to the respective parts of the image processing apparatus 200. Further, as mentioned above, the information stored in the device information storage part 290 may be changed (step S111) in response to the changes of the settings carried out as a result of the user operating the operation part 280 or carried out as a result of the user operating the other parts of the image processing apparatus 200.

It is noted that in the embodiment of the present invention, step S101 shown in FIG. 3 is carried out by the image reception part 220; steps S102, S103 and S103A are carried out by the modification necessity determination part 230; step S104 is carried out by the document modification part 240; step S105 is carried out by the feature image analysis and generation part 250; steps S106, S107 and S109 are carried out by the modification necessity determination part 230; steps S108 and S110 are carried out by the display part 270 and/or and the document modification part 240 and the printing part 260; step S111 is carried out by the user; step S112 is carried out by the modification necessity determination part 230; and step S113 is carried out by the printing part 260. Thus, the modification necessity determination part 230 acts as a first determination part, a second determination part, a third determination part, a fourth determination part, a fifth determination part and a waiting part. The display part 270 and/or the document modification part 240 and the printing part 260 act as the notification and printing part. The feature image analysis and generation part 250 acts as a feature image creation and embedding part. The above-mentioned correspondences between the steps shown in FIG. 3 and the respective parts of the image processing apparatus 200 and the respective functions of the parts of the image processing apparatus 200 are not necessarily limited to those mentioned above, and may be changed as is appropriate.

Thus, according to the embodiment of the present invention, as described above, when the data of the document D in which the feature image is embedded is received and printed, it is determined based on the received data of the document D, and the state of the image processing apparatus 200 whether modification (dividing, reducing in size, or so) of the document image D1 is necessary. In a case where the modification is necessary and also the image processing apparatus 200 can carry out the process of embedding a feature image (i.e., effectively has the corresponding function), and also, the user selects that the image processing apparatus 200 itself carries out the process of embedding a feature image, the image processing apparatus 200 carries out the modification on the document image D1, newly creates a feature image based on the modified image, and embeds the created feature image in the modified image. On the other hand, in a case where the modification is necessary but the image processing apparatus 200 cannot carry out the process of embedding a feature image (i.e., does not effectively have the corresponding function) or the user does not select that the image processing apparatus 200 itself is to carry out the process of embedding a feature image, the image processing apparatus 200 shows the user the condition for avoiding the modification, and also urges the user to select whether to wait until the image processing apparatus 200 enters the state of being able to print the document image D1 without carrying out the modification or immediately print the document image D1 in the state where the feature image is not, in the appropriate state, embedded. When the user selects to wait until the image processing apparatus 200 enters the state of being able to print the document image D1 without carrying out the modification, the printing is carried out when the image processing apparatus 200 enters the state of being able to print the document image D1 without carrying out the modification. When the user selects to immediately print the document image D1 in the state where the feature image is not, in the appropriate state, embedded, the image processing apparatus 200 displays to the user that the feature image is not, in the appropriate state, embedded, and immediately prints the document image D1 after carrying out the modification. Thus, as is necessary, the image processing apparatus 200 prints the document in which the feature image is, in the appropriate state, embedded, or provides the printed matter immediately although the feature image is not in the appropriate state, with displaying the situation.

Thus, according to the embodiment of the present invention, when data of a document in which a feature image is embedded is received and is printed, it is possible to, depending on the circumstances, prevent the feature image from being destroyed through modification of the received data (steps S104, S105 and S113, or steps S106, S107, S109, S111, S112 and S113). That is, it is possible to prevent the feature image from becoming one with which a detection of tampering is not available.

It is noted that the processing operations of the embodiment of the present invention described above with reference to FIGS. 3, 4, and so forth, may be carried out by hardware, software, of a combination of hardware and software.

In a case where the processing operations of the embodiment are carried out by software, a program, which records a processing sequence (processing instructions) of the processing operations of the embodiment of the present invention described above with reference to FIGS. 3, 4, and so forth, may be read from a ROM (Read Only Memory), or such, in which the program is stored, into a memory (RAM (Random Access Memory) or such) included in a computer embedded in dedicated hardware, and may be executed by the computer. Alternatively, the above-mentioned program may be installed in a general-purpose computer that can carry out various processes, and may be executed by the general-purpose computer.

For example, the program may be provided in a state where the program is previously recorded in a hard disk, a ROM, or such, as a recording medium. Alternatively, the program may be provided in a state where the program is temporarily or permanently stored (recorded) in a removable recording medium such as a magnetic disk such as a floppy (registered trademark) disk or such, an optical disk such as a CD (Compact Disc), a DVD (Digital Versatile Disc), a magneto optical disk such as a MO (Magneto Optical) disk, or such.

Such a removable recording medium may be provided in a form of a so-called "software package" or "packaged software" (or "package software").

It is noted that the program may installed in a computer from a removable recording medium such as that described above and executed by the computer. Alternatively, the program may be transferred to the computer from a download site through radio communication, or may be transferred to the computer through wire communication by using a communication network such as a LAN or the Internet, then may be installed in a recording medium such as a hard disk included (or built) in the computer, and may be executed by the computer.

Further, a system according to an embodiment of the present invention may be established in such a manner that the processing operations described above with reference to FIGS. 3, 4, and so forth, are carried out in a time series manner according to the processing sequence (processing instructions) as described above, or in such a manner that the processing operations may be carried out in parallel or individually, depending on the processing capabilities of the apparatuses that carry out the processes, or as is necessary.

Further, the system described above according to the embodiment of the present invention may be established by a logical combination of plural apparatuses, or may be established in such a manner that the functions of the respective apparatuses are mixed.

The present invention is not limited to the specifically disclosed embodiments, and variations and modifications may be made without departing from the scopes of the present invention defined by the claims.

The present Patent Application is based on Japanese Priority Patent Applications Nos. 2010-119332 and 2011-71098, filed on May 25, 2010 and Mar. 28, 2011, respectively, the entire contents of which are hereby incorporated herein by reference.

What is claimed is:

1. An image processing apparatus, comprising:
a first determination part that determines whether an image in which a feature image is embedded is to be modified when the image is printed, based on the image and a state of the image processing apparatus;
a selection receiving part that receives a selection as to whether to carry out embedding the feature image if the first determination part has determined that the modification is necessary;
a feature image embedding part that, if the selection receiving part has received a selection to carry out embedding the feature image,
    removes the feature image from the image in which the feature image is embedded,
    creates a new feature image for a modified image on which the modification determined by the first determination part has been carried out, and
    embeds the created new feature image in the modified image; and
a second determination part that, if the selection receiving part does not receive a selection to carry out embedding a feature image, determines a condition for avoiding the modification by determining whether a change of setting to print the image without carrying out the modification, is available in the image processing apparatus, and
selects whether to print the image in which the feature image is not, in the appropriate state, embedded or
wait to print until the image processing apparatus enters a state of being able to print the image without carrying out the modification.

2. The image processing apparatus as claimed in claim 1, further comprising:
a waiting part that causes the image processing apparatus to wait to print the image until the condition for avoiding the modification determined by the second determination part is satisfied.

3. The image processing apparatus as claimed in claim 1, further comprising:
a third determination part that determines, based on the condition for avoiding the modification determined by the second determination part, whether the condition for avoiding the modification can be satisfied by a change of setting in the image processing apparatus.

4. The image processing apparatus as claimed in claim 3, further comprising:
a notification and printing part that, when the third determination part determines that the condition for avoiding the modification cannot be satisfied by the change of setting in the image processing apparatus, reports that the appropriate feature image is not embedded, and causes the image processing apparatus to print the image.

5. The image processing apparatus as claimed in claim 3, further comprising:
a fourth determination part that, when the third determination part determines that the condition for avoiding the modification can be satisfied by the change of setting in the image processing apparatus, determines according to a given instruction whether to print the image in which the feature image is inappropriate or wait to print the image until the image processing apparatus satisfies the condition for avoiding the modification.

6. The image processing apparatus as claimed in claim 1, further comprising:
a feature image creation and embedding part that creates a feature image for the image on which the modification determined by the first determination part has been carried out and embeds the created feature image into the image on which the modification has been carried out.

7. The image processing apparatus as claimed in claim 6, further comprising:
a fifth determination part that determines, according to a given instruction, whether to cause the feature image creation and embedding part to create the feature image for the image on which the modification has been carried out and embed the created feature image into the image on which the modification has been carried out.

8. An image processing method, comprising:
determining, via a first determination part, whether an image in which a feature image is embedded is to be modified when the image is printed by an image processing apparatus, based on the image and a state of the image processing apparatus;
receiving a selection as to whether to carry out embedding the feature image if the first determination part has determined that the modification is necessary;
if the selection receiving part has received a selection to carry out embedding the feature image,
    removing the feature image from the image in which the feature image is embedded,
    creating a new feature image for a modified image on which the modification determined by the first determination part has been carried out, and
embedding the created new feature image in the modified image; and
determining, via a second determination part, a condition for avoiding the determined modification if the determined modification is necessary by determining whether a change of setting to print the image without carrying out the modification, is available in the image processing apparatus, and
selects whether to print the image in which the feature image is not, in the appropriate state, embedded or
wait to print until the image processing apparatus enters a state of being able to print the image without carrying out the modification.

9. The image processing method as claimed in claim 8, further comprising:
the image processing apparatus waiting to print the image until the determined condition for avoiding the modification is satisfied.

10. The image processing method as claimed in claim 8, further comprising:
determining based on the determined condition for avoiding the modification whether the condition for avoiding the modification can be satisfied by a change of setting in the image processing apparatus.

11. The image processing method as claimed in claim 10, further comprising:
when determining that the condition for avoiding the modification cannot be satisfied by the change of setting in the image processing apparatus, reporting that the appropriate feature image is not embedded, and printing the image.

12. The image processing method as claimed in claim 10, further comprising:

when determining that the condition for avoiding the modification can be satisfied by the change of setting in the image processing apparatus, determining according to a given instruction whether to print the image in which the feature image is inappropriate or wait to print the image until the image processing apparatus satisfies the condition for avoiding the modification.

13. The image processing method as claimed in claim 8, further comprising:
creating a feature image for the image on which the determined modification has been carried out and embedding the created feature image into the image on which the modification has been carried out.

14. The image processing method as claimed in claim 13, further comprising:
determining, according to a given instruction, whether to create the feature image for the image on which the modification has been carried out and embed the created feature image into the image on which the modification has been carried out.

* * * * *